2,786,051

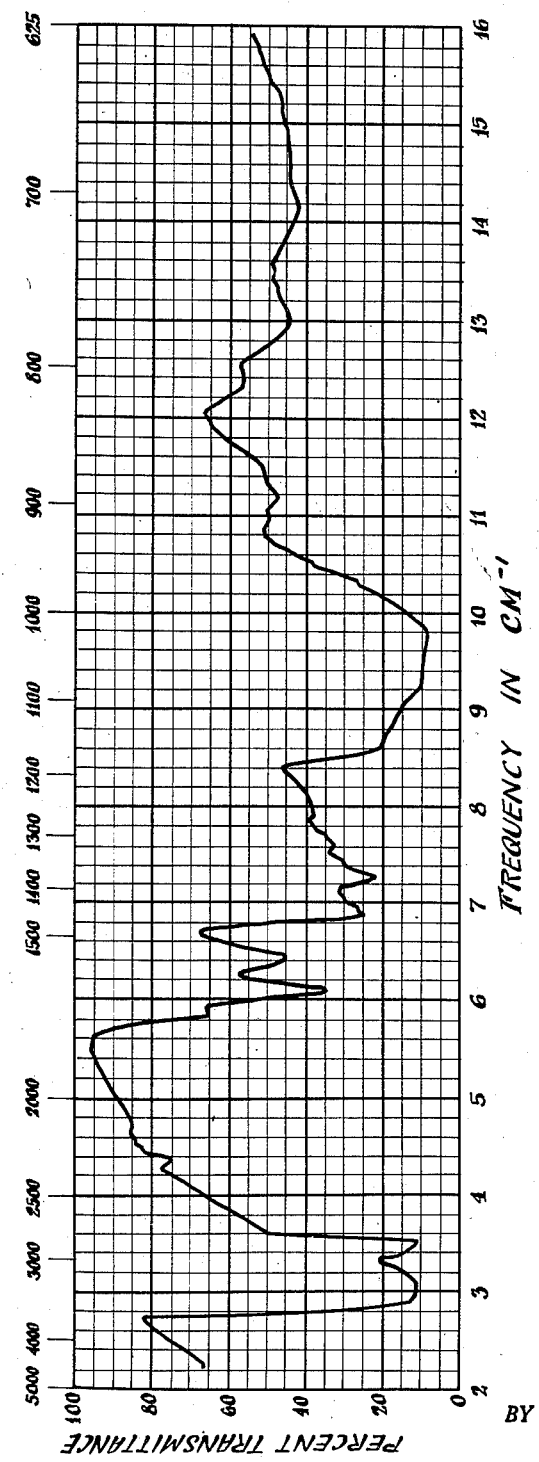

GROWTH-PROMOTING SUBSTANCES AND THEIR RECOVERY

Paul György, Villanova, Pa., and Richard Kuhn and Friedrich Zilliken, Heidelberg, Germany, assignors, by mesne assignments, to American Home Products Corporation, New York, N. Y., a corporation of Delaware Application April 18, 1952, Serial No. 283,006

12 Claims. (Cl. 260—211.5)

This invention relates to new substances which are biologically active, and to their recovery from naturally available materials. More particularly, it relates to the isolation and recovery of new biologically-active substances capable of promoting the growth of the microorganism *Lactobacillus bifidus* from human (breast) milk by a procedure which permits the obtainment of the new growth factor in relatively pure form.

By the third or fourth day after birth the intestinal flora of the breast-fed infant is characterized by the presence therein of *Lactobacillus bifidus* as the predominating organism. In fact, the stools of breast-fed infants are characterized by the presence of this microorganism as constituting almost the entire flora.

As seen in smears, *L. bifidus* organisms are gram-positive, straight or curved rods that are nonmotile and that do not form spores. One or both ends may appear to be split longitudinally to give the effect of two short branches, this appearance leading to the term "bifid." One end of the organism may be bulbous or racket-shaped.

The predominance of this microorganism in the intestinal tract and in the feces of infants is characteristic only of those who are fed by human or mothers' milk. Infants fed by the milk of some other animals, such as cow's milk, or with preparations in which cow's milk is an important constituent, do not show the predominance of *L. bifidus* in their intestinal tract or stools, and show in their feces a less uniform flora with an appreciable proportion of gram-negative rods and cocci.

The fact that a stable *L. bifidus* flora is characteristic only of the intestinal tract of breast-fed infants is now fully understood and appreciated by pediatricians and other specialists in the medical, biological, and nutritional sciences. See, for example, the publications of Tissier; Comptes rendus soc. biol., 51, pages 943–945; and 60, pages 359–361; and Ann. inst. Pasteur, 19, pages 109–123; and 22, pages 189–207. See also the papers of Moro; Wien. klin. Wochschr.; 13, pages 114–115, and Jahrb. Kinderheilk, 61, pages 687–734; and 61, pages 870–899. That the original observations of Tissier concerning the predominance of *L. bifidus* in nurslings' stool have been amply confirmed is pointed out in the more recent publication of Norris, Flanders, Tomarelli and György in the Journal of Bacteriology, 60, pages 681–696 (December 1950).

Medical authorities are now in general agreement that many of the advantages which a breast-fed infant seems to have, insofar as its nutrition and resistance to certain diseases are concerned, are attributable, at least in part, to the predominance in the intestines of *L. bifidus*. The predominance of this organism is now believed to be of physiological significance, and its growth may prevent intestinal disorders caused by other bacteria. Resistance to bacterial intestinal diseases, and even to parenteral disorders, such as respiratory infections, is typical of breast-fed infants, infants which are bottle-fed with the milk of cows and other animals being markedly more susceptible to such disorders. In this connection see the article of Robinson, Lancet, "Infant Morbidity and Mortality," vol. CCLX, page 788 (April 7, 1951).

In the infant colon in which a stable *L. bifidus* flora is lacking, it is now generally believed that the infant is more likely to suffer from disorders attributable to the growth of other bacteria, some of which are harmful to the infant, since competition for the available food supply in the infant intestinal tract where *L. bifidus* flourish reduces the possibility that other bacteria, particularly the harmful *B. coli*, may grow in considerable numbers or in extensive colonies. In any event where the gram-positive bacillus *L. bifidus* is present in large numbers in the infant intestine, which occurs only when the infant is breast-fed, there is considerably less growth of other microorganisms particularly the gram-negative *B. coli*, *Clostridia*, and airborn microorganisms, such as the *Sarcinae* bacteria. While the reasons for the superior resistance to disease of breast-fed infants, as compared with infants who are fed on cow's milk, or on the usual infant formulae in which cow's milk is a principal constituent are not fully understood, pediatricians are generally agreed, however, that in some measure at least the superior resistance is attributable to the growth of an extensive *L. bifidus* flora in the intestines of nurslings, this bacterium being absent in any appreciable numbers from the intestines of all infants except those who are nursed with human milk. Interest in the isolation and determination of the growth requirements of *L. bifidus* has therefore been stimulated by its apparently unique predominance in the intestinal tract of the breast-fed infant.

We have been engaged for some time in the isolation from human or breast milk of the active biological substances which are responsible for promoting the growth of *L. bifidus* in the intestines of infants which are breast-fed, which active principle is not present in significant or appreciable amounts, or is almost completely absent from other milk sources, such as cow's milk. Since *L. bifidus* is present in considerable numbers in the intestines of a new-born infant at about three or four days after birth, this organism then flourishing and growing in considerable colonies where the infant is breast-fed but failing to grow, or even to appear subsequently, in the intestines of an infant which is bottle-fed, we concluded that there must be present in human or breast milk some substance or substances specific to the growth of *L. bifidus*, which substance or substances appear to be absent from bovine milk and from the milk of goats and sheep.

We have now succeeded in securing these new biologically-active substances in highly purified form from mothers' or human breast milk, and we have established that these substances, which we have called the *L. bifidus* growth factor, are either absent from cow's milk and the other common foods normally supplied to the bottle-fed infant, or present therein only in insignificant amounts. We have further succeeded in identifying certain chemical characteristics of these novel chemical substances. From our experimental work to date we believe that many strains of the *L. bifidus* microorganism will not grow and develop in flourishing colonies in the absence of these new active biological substances. Moreover, when the new *L. bifidus* growth factor is present in the infant diet, stimulation of the growth of this microorganism should occur, thereby resulting in an extensive flora in the intestinal tract.

It is therefore the principal object of our invention to recover these new biological substances from breast milk. In order to permit the recovery of this mixture of novel chemical substances, which, chemically, consist of different growth factors all of them belonging to the group of nitrogen-containing saccharides, and which are recovered in a biologically-active form but one which is not, in all respects, identically the same as that in which they appear in the natural human milk, we have devised a new and highly efficient procedure for the treatment and fractionation of milk secured from lactating mothers. To render this improved method available for use in the treatment of human milk is therefore a further object of our invention.

In recovering the new biological substances from breast milk we have first found it necessary to remove from the milk the fats, proteins, minerals and salts, and sugars, before the milk is sufficiently purified from substances with which the L. bifidus growth factor is associated to permit isolation of the new substances in purified form. Ordinarily we prefer to remove the fats from the breast milk first, this being efficiently done by means of a skimming or defatting operation. Such a skimming operation is not new per se, and may be carried out in accordance with any available procedure. This defatting step may then be followed, first by removing the proteins; then by removing the mineral and salt constituents of the milk; and finally by removing the lactose. The thus purified milk, free from constituents which might interfere with the recovery of the desired new substances, is then in condition to permit its treatment in order to recover the new L. bifidus growth promoting factor in a relatively high degree of purity.

Breast milk as obtained from either the pre-partum or post-partum lactating mother is therefore first subjected to skimming in order to remove all or the greater part of the fatty constituents present therein. This is customarily carried out by treating the milk in a centrifuge, or any other available skimming procedure may be employed. We have found that the fat may be skimmed from breast milk very readily by utilizing a centrifugal separator of any commercially available form, such as one made and sold by the Sharples Specialty Company of Philadelphia, Pennsylvania.

The skimmed milk is next subjected to a protein removal operation in which the casein and other protein constituents of the breast milk are precipitated and removed. Any industrially-utilized protein removal operation can be employed, and we may, for example, dialyze through a semi-permeable membrane. The property of dialyzing through a membrane is very characteristic of the L. bifidus growth promoting factor in human milk. When utilizing a dialysis cell we have found that a cellophane diaphragm is very satisfactory, the protein constituents of the human milk remaining in the cell, and the active growth promoting factor passing through the cellophane membrane along with the remainder of the milk when the dialysis is carried out against a volume of water which is much larger than that of the milk treated.

It is, however, not necessary to remove the protein constituents by dialysis, and they may be precipitated and separated from the skimmed milk by the use of any suitable precipitating agent. When salt precipitation of the proteins is utilized we have found it advantageous first to dilute the defatted milk by the addition of a considerable quantity of water thereto. It is only by thus diluting the skimmed milk by the addition thereto of an appreciable quantity of distilled water before precipitating the proteins that we have found it possible to precipitate and remove almost all of the protein constituents of the milk without, at the same time, carrying down and removing a part of the active growth promoting factor. While the exact amount of dilution necessary to permit precipitation of the protein without at the same time also precipitating part of the growth promoting factor (which would then be removed and discarded with the protein fraction), will depend to some extent on the protein content of the milk and on the nature of the protein precipitating agents used, we have ordinarily found it advantageous to add to the defatted milk a volume of distilled water ranging from about 8 times to about 20 times the volume of the skimmed milk. Dilutions of over about 20 to 1 are generally not necessary, and while the proteins can be precipitated without too much loss of the growth promoting factor at dilutions below about 8 to 1, to permit its economical recovery we have found it ordinarily essential to dilute the skimmed milk by the addition thereto of about at least 8 parts of distilled water when salt protein precipitating agents, such as zinc sulfate and barium hydroxide, are utilized.

In carrying out this step of our improved process, after diluting the skimmed milk by the addition thereto of an amount of distilled water falling within the range specified, we next add to the resulting aqueous solution a fairly concentrated solution of zinc sulfate in water. This is followed by the addition thereto of an aqueous solution of barium hydroxide, whereupon precipitation of an inorganic salt occurs within the diluted skimmed milk, the protein present therein being carried down along with the insoluble inorganic salt. This is accomplished without destroying, carrying down, or removing the active growth promoting factor, which remains in the supernatant milk solution. After separating the protein and inorganic salt by filtration or on a centrifugal separator, the filtrate is recovered and further treated.

In describing our preferred procedure for removing proteins from the skimmed breast milk, particularly by dialysis, or by a procedure wherein the proteins are occluded and carried down with an insoluble salt without at the same time carrying down and removing the growth promoting principle, we do not of course mean that it is essential to utilize this specific salt de-proteinizing step, or that other industrially available methods for the removal of proteins may not also be utilized. Various procedures for the removal of proteins other than salt precipitation may be employed with success. Also, we can utilize in the precipitation of the proteins any of those salts which are now utilized for the separation and removal of the protein constituents from skimmed milk by similar precipitation procedures.

As the next step in our process the liquid milk fraction is treated to remove inorganic salts, as well as to remove traces of metallic impurities, such as the salts of zinc and barium, or other inorganic salts, which may remain from the de-proteinizing step. In removing the inorganic salts present in the milk we have found it advantageous to utilize ion exchangers such as are customarily manufactured and sold for this purpose, these exchangers normally employing an inorganic or resin base exchange material.

In removing the salts and other mineral or inorganic constituents the skimmed milk, previously freed from the protein constituents thereof, is preferably first treated with a cation exchanger, and the effluent from this exchanger then treated on an anion exchanger. When utilizing a commercially available cation exchanger employing Permutit or other base exchange material on the hydrogen cycle, the treated milk fraction, as it is recovered, will ordinarily have a pH value on the acid side, i. e., a pH of about 1.3 or below being common. The next step involves subjecting the residual milk fraction to the action of an anion exchanger, at the conclusion of which treatment on the anion exchange hydroxyl cycle the pH is ordinarily close to neutrality, i. e., 6.5 or above. By successive treatments with ion exchanger materials, first on the cation exchange cycle, and then on the anion exchange cycle, the milk fraction is freed from mineral or inorganic materials present therein, such as the salt constituents thereof.

While the use of ion exchange apparatus to eliminate the inorganic salt elements present in the de-proteinized skimmed milk is very satisfactory, and ordinarily we prefer to employ this procedure, our invention is of course not restricted to the removal of these salt constituents by ion exchangers, as other available methods for removing inorganic elements and salts from the milk fraction may also be utilized.

The milk fraction is next treated with an adsorbent to permit adsorption of the L. bifidus growth promoting factor on an adsorbent medium, from which it can then be removed or eluted in purified form. Selective adsorbents for the growth promoting factor include activated carbon, charcoal, cellulosic products such as filter paper, and various cellulosic powders such as those sold commercially by the West Virginia Paper Company and other suppliers. Various adsorbing resins may also be used for selectively adsorbing the active substances from the diluted milk fraction remaining after the previous treatment.

Ordinarily, however, we prefer to utilize in the selective adsorption an adsorbent such as activated carbon, and the commercial charcoal products sold under the trade-mark names "Norit," "Carboraffin," etc. are very satisfactory. Such charcoal adsorbents may be utilized either in the forms of columns, or in batchwise adsorption, employing the adsorbent in granular or powder form. The active substances may also be adsorbed in substantially pure form on a cellulosic material such as ordinary filter paper (for example Whatman Paper No. 1), and a selective adsorbent step utilizing such an adsorbent may also be utilized at this stage of our process.

We will describe our adsorbing process as carried out utilizing activated carbon as a typical adsorbing agent. The milk fraction is brought into contact with the activated carbon, employing either batchwise adsorption, or with the carbon in columnar form, the L. bifidus growth factor being adsorbed on the carbon. If desired, and in order to avoid the necessity of utilizing too large an amount of charcoal in proportion to the volume of the milk fraction treated, it may be advantageous first to evaporate the milk fraction to smaller volume before bringing it into contact with the adsorbent. If evaporation to reduced volume is carried out it may advantageously be done under sub-atmospheric pressure, i. e., at a pressure below normal atmospheric pressure, although the utilization of a reduced pressure is not essential, since we have found that the L. bifidus growth promoting factor is not injured or destroyed by being heated for relatively short periods of time to temperatures as high as 100° C.

At the conclusion of this step the L. bifidus growth promoting factor, together with other non-removed constituents of the milk, if any, which may be present, such as lactose, protein-like materials, creatine and urea, are adsorbed on the activated charcoal, and the active substances may be eluted therefrom by the use of a suitable eluting liquid. We have found it desirable first to wash the adsorbent several times with hot water, or with a dilute acid, such as dilute acetic acid (up to about 5% concentration). When dilute acid is utilized it may also be used relatively warm. Hot water alone at a temperature of approximately 70° C. is also effective in removing lactose and other impurities adsorbed on the charcoal, and several treatments with hot water at about 70° C. will remove most of the lactose. However we have found that elution with weak acids, such as 5% acetic acid, at not too low a pH and at temperatures not exceeding about 70° C., will not destroy the L. bifidus growth promoting factor, and dilute acid is somewhat more effective than hot water in removing the lactose, other saccharides, and protein-like contaminants adsorbed on the charcoal along with the active principle.

While some dilute acids may be effectively utilized at a temperature below about 70° C., the pH being such that the treatment agent is but weakly acidic in reaction, we ordinarily prefer to employ dilute acetic acid of approximately 5% $CH_3COOH$ concentration at a temperature of 70° C. Dilute acetic acid as a treatment agent also has the advantage that in the ensuing evaporation steps the acetic acid is volatile and may be driven off, other suitable inorganic acids, such as dilute sulfuric acid and dilute phosphoric acid, for example, not being similarly volatile.

The elution with hot dilute acid is preferably carried out several times, the adsorbent being repeatedly washed with the eluting agent in order to remove substantially all of the sugars and protein-like impurities. We have found it advantageous to elute the activated charcoal adsorbent at least five or six times in order to insure substantially complete removal of these contaminants.

The biologically active substances may now be recovered from the adsorbent by elution with a suitable eluant. We have found it advantageous to utilize for this purpose a relatively dilute acid, the acid concentration being, however, higher than that previously used to remove the lactose and protein-like contaminants. Acetic acid of approximately 20% concentration is a very satisfactory eluting agent, the adsorbent being eluted a number of times with this eluant, and the separate liquid fractions collected. It is preferable to utilize this acid solution at a relatively high temperature, such as a temperature of approximately 70° C., although the use of heated dilute acid is not absolutely necessary. By employing an elevated temperature, however, i. e., a temperature not in excess of about 70° C., the growth promoting factor can be recovered from the adsorbent in substantially quantitative yields in a minimum of eluting operations. If it is not objectionable from a procedural standpoint to employ a number of separate elutions, the dilute acid used may be cold, i. e., at room temperature, although ordinarily there is no particular advantage in so operating.

While our preferred eluting agent to recover the growth promoting factor from the charcoal is acetic acid of approximately 20% concentration utilized at a temperature of approximately 70° C., other dilute acids may also be utilized for the elution. As explained above, however, acetic acid has the advantage that it is volatile during the ensuing evaporation step, and is readily removed from the eluate during the step of concentrating and recovering the biologically-active substances.

We have also found it advantageous to utilize in the elution an aqueous eluting agent comprising phenol and acetic acid. One having an acetic acid concentration of 20% and a phenol concentration of 5% is especially satisfactory, and it may be utilized either in the cold, or at a temperature of approximately 70° C. When utilizing acetic acid-phenol solution in the elution, it is usually advantageous to remove the phenol from the eluate by taking it up with ether and separating off the ether layer from the aqueous liquid containing the growth promoting factor, before proceeding further with the concentration and recovery of the active substances.

The growth promoting factor may then be recovered from the elution liquid by any suitable procedure. The combined eluate may, for example, be evaporated to dryness, thereby leaving the active substances behind as a mixture in the form of a dry white powder. As an alternative procedure, the novel substances may be recovered by the use of a conventional freeze-drying operation. If evaporation to dryness is employed to isolate and recover the growth factor, it is not necessary to carry out the evaporation at a pressure less than atmospheric, although concentration or evaporation under a reduced pressure less than atmospheric is frequently advantageous. We have found that the novel substances will withstand temperatures of 100° C. or somewhat higher without chemical destruction, and evaporation to dryness at normal atmospheric pressure can therefore be employed.

For some purposes it is not necessary to recover the active material in the form of a dry powder, as it may be utilized in the form of its solution, either added to foodstuffs, or otherwise, as desired. It is also possible to adsorb the L. bifidus growth promoting factor on a suitable selective adsorbent, such as activated carbon, charcoal, resin adsorbents, cellulosic adsorbents, etc., and again elute it to recover the active substances, thereby securing further a higher degree of purification. Repetition of adsorption on a suitable absorbent and elution may be carried out as frequently as desired to recover the active substances in a high degree of purity.

Moreover, the *L. bifidus* growth factor adsorbed on a suitable carrier or medium may be utilized as such for food and other purposes, and it is not always necessary that it be recovered from solutions thereof in the solid state. Solutions of varying concentration and purity, or compositions in which the active substances are suspended on or associated with a carrier, which may be an adsorbent or other solid substance, also possess valuable nutritive properties and, for some uses, may be utilized for nutritional purposes in that form.

Alcohol fractionation may also be effectively used in the recovery and purification of the biologically-active substances. Most of the active material is precipitated from an aqueous solution at ethanol concentration ranging from 85–95%. To an aqueous solution of the active substances it is therefore possible to add absolute ethanol until the ethyl alcohol concentration of the aqueous solution falls within the range 85–95%, whereupon the desired product precipitates in a very pure form.

It is also possible to take up the white powdery product in a suitable solvent such as water or acetic acid at the conclusion of the evaporation to dryness step, and effect further purification by reprecipitating it from the solution by the addition of absolute ethanol to adjust to an ethyl alcohol concentration of 85–95%. The precipitating action of ethanol of this concentration appears to be quite specific, as at lower concentrations of ethanol (below 85%), or with absolute ethanol, or with ethanol-ether mixtures, the precipitated material has been found to contain only small amounts of the growth promoting substances.

The following illustrative example represents a preferred procedure in accordance with our invention:

Example 6 liters of human milk was defatted by treatment in a centrifugal separator and then diluted by the addition of 48 liters of distilled water. The diluted milk was then deproteinized by the addition thereto of zinc sulfate and barium hydroxide. The precipitate, along with the proteins, was removed on a centrifugal separator. The mineral and inorganic constituents were then removed from the filtrate by treatment with ion exchangers, employing both cation and anion exchangers.

The milk fraction freed of fats, proteins and mineral constituents was next treated with a charcoal adsorbent, using "Norit" carbon. Before being brought into contact with the adsorbent, the milk fraction showed a *Lactobacillus bifidus* growth promoting activity such that 2.7 milligrams were required to furnish 1 unit of activity. 1 unit of activity, defined as E, is the activity contained in 0.06 milliliter of human (breast) milk of an average activity level.

The mg./E value for the milk fraction was therefore 2.7, and this value is a measure of the activity, lower values representing higher activity levels. The total activity for promoting the growth of *L. bifidus* contained therein (solids content 397.0 grams), was 147,000 units.

After the milk fraction had been brought into contact with the charcoal adsorbent and adsorption was complete, the charcoal was removed by filtration. The filtrate had an activity of 24,000 units, a solids content of 197.6 grams, and an mg./E value of 8.3.

The activated charcoal adsorbent was then washed as follows, and the wash liquids were separately collected:

a. Three times with water, each time with 2.5 liters.
b. Once with 2.5 liters of 5% acetic acid.
c. Twice with water, each time with 2.5 liters.
d. Once with 2.5 liters of 5% acetic acid.

The total activity recovered in the wash liquids was 11,300 units.

The mg./E value of each of these wash liquids, the solids content therein, and the total units of activity in each, were as follows:

|  | mg./E | Solids Content, grams | Total Units of Activity |
|---|---|---|---|
| First water wash liquid | 25.0 | 127.0 | 5,100 |
| First acetic acid wash liquid | 9.5 | 28.0 | 3,000 |
| Second water wash liquid | 5.45 | 10.0 | 1,800 |
| Second acetic acid wash liquid | 2.02 | 2.88 | 1,400 |
| Totals | | 167.88 | [1] 11,300 |

[1] In wash liquids.

The adsorbed active material was then eluted from the charcoal, employing the eluting agents specified in tabular form below. In each case the mg./E value for the particular fraction is given, the solids content thereof, and the total activity contained therein.

| Eluant | mg./E | Solids Content, grams | Total Units of Activity |
|---|---|---|---|
| 2.5 liters 10% acetic acid | 0.704 | 5.03 | 7,000 |
| 2.5 liters 20% acetic acid | 0.260 | 10.78 | 41,000 |
| Do | 0.295 | 6.66 | 23,000 |
| Do | 0.295 | 4.36 | 15,000 |
| Do | 0.338 | 2.15 | 6,300 |
| Do | 0.300 | 1.60 | 5,300 |
| Do | 0.322 | 1.03 | 3,200 |
| Totals | | 31.61 | [1] 100,800 |

[1] Units in eluates.

The total units of activity recovered, including the activity in the filtrate, the wash liquids, and the eluates, was 136,100 units. Of this activity, 100,800 units were contained in the eluates, which had a total solids content of only 31.61 grams. The eluates from the charcoal adsorbent therefore contained 68.5% of the activity with only 7.95% of the solids.

The second eluate, whose mg./E value was 0.26, is more than ten times as active as the milk fraction initially subjected to adsorption on the charcoal (mg./E=2.7)

The new biologically-active substances are characterized as follows: They are free of sulfur and phosphorus, free of amino acids, peptides and proteins. They do not give a positive test with ninhydrin. However, after acid hydrolysis, the ninhydrin test becomes positive due to the formation of d-glucosamine. Almost all of the nitrogen contained in the substances (typical analyses show the presence of 1.7 to 2.0% N) is, by acid hydrolysis, converted to hexosamines as determined by colorimetric determinations (Morgan-Elson). 70% of the total hexosamines have been recovered in the form of crystallized d-glucosamine hydrochloride. Other typical constituents of the substances isolated from breast milk are fucose and galactose.

The new substances contain N, H, C and O, and do not contain either S or P. As recovered, they constitute a mixture of chemical compounds which are closely related chemically, and differ from each other mainly in their chromatographic properties (as, for example, in water solution on a cellulosic adsorbent such as Whatman No. 1 filter paper).

The infrared absorption spectrum of a mineral oil mull of the new biologically-active product exhibits maxima at approximately the following wave lengths: 3700, 3000, 2360, 1820, 1600, 1500, 1410, 1190, 920, 830, 800 and 740 cm.$^{-1}$. Of these, the maxima at 1820, 1410, 920, 830, 800 and 740 cm.$^{-1}$ are broad maxima. The maxima at 3700, 3000, 1600 and 1500 cm.$^{-1}$ are relatively sharper peaks. The infrared spectrum within the range 625 cm.$^{-1}$ to 5000 cm.$^{-1}$ is shown on the annexed drawing.

Modifications may be made in carrying out this invention without departing from the spirit and scope thereof, and the invention is to be limited in scope only by the appended claims.

We claim:

1. The process of recovering the growth promoting factor for *L. bifidus* from human milk which comprises de-fatting said human milk, removing substantially all the protein therefrom, removing salt and mineral constituents thereof, passing said residual milk fraction in contact with an adsorbent whereby said growth promoting factor, together with additional unremoved constituents of said milk fraction, are adsorbed thereby, eluting said additional milk constituents from said adsorbent by treatment thereof several times with aqueous acetic acid of approximately 5 percent concentration at a temperature of approximately 70° C., eluting said growth promoting factor in highly purified form from said adsorbent by treatment thereof several times with acetic acid solution of approximately 20 percent concentration at a temperature of approximately 70° C., and recovering said growth promoting factor in highly purified form from said eluant.

2. The process of recovering the growth promoting factor for *L. bifidus* from human milk which comprises de-fatting said milk, diluting said de-fatted milk by the addition thereto of from 8 volumes to 20 volumes of water, said volume ratio being based on the volume of said de-fatted milk, precipitating the proteins in said diluted human milk by the addition thereto of protein precipitating agents, treating said clear supernatant diluted milk fraction with ion exchangers in order to remove salt and mineral constituents thereof, passing the purified milk fraction over a solid adsorbent, whereby said growth promoting factor, together with other constituents of said human milk, are adsorbed on said adsorbent, eluting said solid adsorbent several times with aqueous acetic acid solution of approximately 5 percent concentration at a temperature of approximately 70° C. in order to remove additional impurities initially present in said milk and adsorbed together with said growth promoting factor on said adsorbent, eluting said adsorbent with dilute acetic acid of approximately 20 percent concentration at a temperature of approximately 70° C., said elution being carried out several times, in order to elute and remove said growth promoting factor therefrom, and treating said eluate in order to recover said growth promoting factor in relatively concentrated form therefrom.

3. The process of recovering the growth promoting factor for *L. bifidus* from human milk which comprises de-fatting said milk, diluting said de-fatted milk by the addition thereto of from 8 volumes to 20 volumes of water, said volume ratio being based on the volume of said de-fatted milk, precipitating the protein in said diluted human milk by the addition thereto of a salt precipitating agent, treating said clear supernatant diluted milk fraction with ion exchangers in order to remove salt and mineral constituents thereof, passing the purified milk fraction over a solid adsorbent, whereby said growth promoting factor, together with unremoved constituents of said human milk, are adsorbed on said adsorbent, eluting said solid adsorbent several times with aqueous acetic acid solution of approximately 5 percent concentration at a temperature of approximately 70° C. in order to remove additional impurities initially present in said milk and adsorbed together with said growth promoting factor on said adsorbent, eluting said adsorbent several times with dilute acetic acid solution of approximately 20 percent concentration at a temperature of approximately 70° C. in order to elute and remove said growth promoting factor therefrom, and precipitating said growth promoting factor in highly purified form by the addition thereto of ethanol to adjust the ethanol concentration to a value within the range 85–95%.

4. The process of recovering the growth promoting factor for *L. bifidus* from human milk which comprises de-fatting said milk, removing substantially all the protein therefrom, removing salt and mineral constituents thereof, adsorbing said growth promoting factor and remaining impurities present in said milk fraction by passing said milk fraction in contact with an adsorbent, eluting impurites adsorbed on said adsorbent along with said growth promoting factor from said adsorbent by contacting said adsorbent several times with an eluting liquid comprising aqueous acetic acid solution of approximately 5 percent concentration at a temperature of approximately 70° C., eluting said growth promoting factor from said adsorbent by treatment thereof several times with an aqueous solution of acetic acid of approximately 20 percent concentration at a temperature of approximately 70° C. and collecting said eluate containing said factor, taking up said growth promoting factor from said eluate with a phenol-water mixed solvent containing substantially 80% of phenol, bringing said solution of said growth promoting factor into contact with an adsorbent whereby said growth promoting factor is adsorbed a second time on an adsorbent, and eluting said growth promoting factor from said adsorbent by treatment thereof several times with an aqueous solution of acetic acid of approximately 20 percent concentration at a temperature of approximately 70° C., whereby said growth promoting factor is recovered in purified form therefrom.

5. The process of recovering the growth promoting factor for *L. bifidus* from human milk which comprises de-fatting said milk, diluting said de-fatted milk by the addition thereto of from 8 volumes to 20 volumes of water, said volume ratio being based on the volume of said de-fatted milk, precipitating the protein in said diluted human milk by the addition thereto of a salt precipitating agent, treating said clear supernatant diluted milk fraction with ion exchangers in order to remove salt and mineral constituents thereof, passing the purified milk fraction over a solid adsorbent, whereby said growth promoting factor, together with unremoved constituents of said human milk, are adsorbed on said adsorbent, eluting said solid adsorbent several times with aqueous acetic acid of approximately 5 percent concentration at a temperature of approximately 70° C. in order to remove additional impurities initially present in said milk and adsorbed together with said growth promoting factor on said adsorbent, eluting said adsorbent by treatment thereof several times with dilute acetic acid solution of approximately 20 percent concentration at a temperature of approximately 70° C. in order to elute and remove said growth promoting factor therefrom, taking up said growth promoting factor from said eluate with a phenol-water mixed solvent containing substantially 80 percent of phenol and subjecting said solution of said growth promoting factor to chromatography utilizing a cellulosic adsorbent in order to further purify said growth promoting factor.

6. The process of recovering the growth promoting factor for *L. bifidus* from human milk which comprises de-fatting said milk, removing substantially all the protein therefrom, removing salt and mineral constituents thereof, adsorbing said growth promoting factor and remaining impurities present in said milk fraction by passing said milk fraction in contact with an adsorbent, eluting impurities adsorbed on said adsorbent along with said growth promoting factor from said adsorbent by contacting said adsorbent several times with an eluting liquid comprising an aqueous solution of acetic acid of approximately 5 percent concentration at a temperature of approximately 70° C., eluting said growth promoting factor from said adsorbent by treatment thereof several times with an aqueous solution of acetic acid of approximately 20 percent concentration at a temperature of approximately 70° C. and collecting said eluate containing said factor, evaporating said eluate to substantial dryness, taking up said substantially dry material in a mixed solvent containing substantially 80% of phenol and 20% of water, bringing said solution of said growth promoting factor again into contact with an adsorbent, whereby said growth promoting factor is adsorbed thereon, and eluting said growth promoting factor from said adsorbent by treatment thereof several times with an aqueous solution of acetic acid of approximately 20 percent concentration at a temperature of approximately 70° C.

7. The process of recovering the growth promoting factor for *L. bifidus* from human milk which comprises de-fatting said milk, diluting said de-fatted milk by the addition thereto of from 8 volumes to 20 volumes of water, said volume ratio being based on the volume of said de-fatted milk, precipitating the protein in said diluted human milk by the addition thereto of a salt precipitating agent, treating said clear supernatant diluted milk fraction with ion exchangers in order to remove salt and mineral constituents thereof, passing the purified milk fraction over a solid adsorbent, whereby said growth promoting factor, together with unremoved constituents of said human milk, are adsorbed on said adsorbent, eluting said solid adsorbent by treatment thereof several times with an aqueous solution of acetic acid of approximately 5 percent concentration at a temperature of approximately 70° C. in order to remove additional impurities initially present in said milk and adsorbed together with said growth promoting factor on said adsorbent, eluting said adsorbent by treatment thereof several times with dilute acetic acid solution of approximately 20 percent concentration at a temperature of approximately 70° C. in order to elute and remove said growth promoting factor therefrom, then evaporating said eluate to substantial dryness, taking up said substantially dry material in a mixed solvent containing substantially 80% of phenol and 20% of water and subjecting said resulting solution to chromatography utilizing a cellulosic adsorbent in order to further purify said growth promoting factor.

8. The process of recovering the growth promoting factor for *L. bifidus* from human milk which comprises de-fatting said milk, removing substantially all the protein therefrom, removing salt and mineral constituents thereof, adsorbing said growth promoting factor and remaining impurities present in said milk fraction by passing said milk fraction in contact with an adsorbent in granular form, eluting impurities adsorbed on said adsorbent along with said growth promoting factor from said adsorbent by contacting said adsorbent several times with an eluting liquid comprising an aqueous solution of acetic acid of approximately 5 percent concentration at a temperature of approximately 70° C., eluting said growth promoting factor from said adsorbent by treatment thereof several times with an aqueous solution of acetic acid of approximately 20 percent concentration at a temperature of approximately 70° C. and collecting said eluate containing said factor, then precipitating said growth promoting factor in highly purified form by the addition to said eluate of ethanol to adjust the ethanol concentration to a value within the range 85–95%, taking up said precipitated growth promoting factor in a phenol-water mixed solvent containing substantially 80% of phenol, passing said solution in contact with a solid adsorbent in columnar form, and eluting said growth promoting factor by treating said adsorbent several times with aqueous acetic acid solution of approximately 20 percent concentration at a temperature of approximately 70° C., said growth-promoting factor being thus recovered in purified form therefrom.

9. The process of recovering the growth promoting factor for *L. bifidus* from human milk which comprises de-fatting said milk, removing substantially all the protein therefrom, removing salt and mineral constituents thereof, adsorbing said growth promoting factor and remaining impurities present in said milk fraction by passing said milk fraction in contact with an adsorbent, eluting impurities adsorbed on said adsorbent along with said growth promoting factor from said adsorbent by contacting said adsorbent several times with an eluting liquid comprising an aqueous solution of acetic acid of approximately 5 percent concentration at a temperature of approximately 70° C., eluting said growth promoting factor from said adsorbent by treatment thereof, several times, with aqueous acetic acid of approximately 20 percent concentration at a temperature of approximately 70° C., and collecting said eluate containing said factor, then evaporating said eluate to substantial dryness, redissolving said substantially dry material in a solvent, and precipitating said growth promoting factor in highly purified form from said solution by the addition thereto of ethanol to adjust the ethanol concentration to a value within the range 85–95%.

10. The process of recovering the growth promoting factor for *L. bifidus* from human milk which comprises de-fatting said milk, diluting said de-fatted milk by the addition thereto of from 8 volumes to 20 volumes of water, said volume ratio being based on the volume of said de-fatted milk, precipitating the protein in said diluted human milk by the addition thereto of a salt precipitating agent, treating said clear supernatant diluted milk fraction with ion exchangers in order to remove salt and mineral constituents thereof, passing the purified milk fraction over a solid adsorbent, whereby said growth promoting factor, together with unremoved constituents of said human milk, are adsorbed on said adsorbent, eluting said solid adsorbent by treatment thereof, several times, with aqueous acetic acid solution of approximately 5 percent concentration at a temperature of approximately 70° C. in order to remove additional impurities initially present in said milk and adsorbed together with said growth promoting factor on said adsorbent, eluting said adsorbent by treatment thereof several times with dilute acetic acid solution of approximately 20 percent concentration at a temperature of approximately 70° C. in order to elute and remove said growth promoting factor therefrom, evaporating said eluate to substantial dryness, redissolving said substantially dry material in a solvent, and precipitating said growth promoting factor in highly purified form from said solution by the addition thereto of ethanol to adjust the ethanol concentration to a value within the range 85–95%.

11. New growth-promoting substances for *Lactobacillus bifidus*, constituting a mixture of closely-related chemical compounds containing N, H, C and O; free from S and P; containing from 1.7 to 2.0% of N; and capable of giving, after acid hydrolysis, a positive test with ninhydrin; said compounds being further characterized in that substantially the entire nitrogen content thereof is converted to hexosamines by acid hydrolysis, and a mineral oil mull thereof having the characteristic infra-red absorption spectrum exhibiting maxima at approximately the following wave lengths: 3700, 3000, 2360, 1820, 1600, 1500, 1410, 1190, 920, 830, 800 and 740 cm$^{-1}$.

12. The compounds of claim 11, further characterized in that they are precipitated from aqueous solutions at an ethanol-water concentration of 85% to 95%.

References Cited in the file of this patent

UNITED STATES PATENTS

| | | |
|---|---|---|
| 2,239,285 | Flanigan et al. | Apr. 22, 1941 |
| 2,442,252 | Alderton | June 1, 1948 |
| 2,590,121 | Polo et al. | Mar. 25, 1952 |

OTHER REFERENCES

Skeggs et al.: J. Bact. 65, 8733–9 (1953), QR–1–58.

Whitly: Bio. Chem. J., 433, 437 (1952).

Rosenthal et al.: "The Role of Lysozyme in the Development of the Intestinal Flora of the New-Born Infant," reprinted from the J. of Infectious Diseases, February 1931, vol. 48, pp. 226–235, Am. Med. Ass'n. Press, 535 N. Dearborn Street, Chicago.

Alderton et al.: J. Bio. Chem., 1945, vol. 157, pp. 43 to 58, QP–501–J7.